United States Patent [19]

Bischoff

[11] 4,420,288
[45] Dec. 13, 1983

[54] DEVICE FOR THE REDUCTION OF SECONDARY LOSSES IN A BLADED FLOW DUCT

[75] Inventor: Hans Bischoff, Gröbenzell, Fed. Rep. of Germany

[73] Assignee: MTU Motoren- und Turbinen-Union GmbH, Munich, Fed. Rep. of Germany

[21] Appl. No.: 275,037

[22] Filed: Jun. 18, 1981

[30] Foreign Application Priority Data

Jun. 24, 1980 [DE] Fed. Rep. of Germany ....... 3023466

[51] Int. Cl.³ .............................................. F01D 9/00
[52] U.S. Cl. ........................... 416/244 A; 415/DIG. 1
[58] Field of Search ............. 415/DIG. 1; 416/193 A, 416/244 A, 248, 244 R, 234

[56] References Cited

U.S. PATENT DOCUMENTS

| 3,039,736 | 6/1962 | Pon ............................ 415/DIG. 1 X |
| 3,578,264 | 5/1971 | Kuethe ....................... 415/DIG. 1 X |
| 4,135,857 | 1/1979 | Pannone et al. ................. 416/193 A |

FOREIGN PATENT DOCUMENTS

| 2135286 | 1/1973 | Fed. Rep. of Germany..415/DIG. 1 |
| 2432608 | 4/1980 | France .......................... 415/DIG. 1 |
| 52-67404 | 3/1977 | Japan ........................... 415/DIG. 1 |
| 52-54808 | 5/1977 | Japan ........................... 415/DIG. 1 |
| 54-515707 | 11/1979 | Japan ........................... 415/DIG. 1 |
| 2042675 | 9/1980 | United Kingdom ......... 415/DIG. 1 |

Primary Examiner—Stephen Marcus
Assistant Examiner—Joseph M. Pitko
Attorney, Agent, or Firm—Scully, Scott, Murphy and Presser

[57] ABSTRACT

A device for the reduction of secondary losses in the bladed flow duct of a turbomachine, wherein the device is arranged in the region of at least one of the two duct walls and, presently, intermediate two circumferentially adjacent blades, and is of the type in that the duct wall has a boundary layer step so that the face of the boundary layer step faces towards the pressure side of the blade.

5 Claims, 6 Drawing Figures

DEVICE FOR THE REDUCTION OF SECONDARY LOSSES IN A BLADED FLOW DUCT

BACKGROUND OF THE INVENTION

1. Field of the Invention

The present invention relates to a device for the reduction of secondary losses in the bladed flow duct of a turbomachine, wherein the device is arranged in the region of at least one of the two duct walls and, presently, intermediate two circumferentially adjacent blades, and is of the type in that the duct wall has a boundary layer step so that the face of the boundary layer step faces towards the pressure side of the blade.

2. Discussion of the Prior Art

The secondary or boundary losses in blade cascades are caused, among other factors, by the fact that the boundary layer (frictional layer proximate the wall) which enters the blade cascade and is produced along the restricting or duct walls, impelled within each individual duct by the transverse pressure gradient from the pressure side of the one blade towards the suction side of the other blade, reaches this suction side in the vicinity of the restricting or duct walls and this transverse flow (secondary flow) which is oblique relative to the base or core flow of the duct boundary layer, increases the boundary layer at the suction side (suction side boundary layer). Generated hereby are boundary or secondary eddies which extensively influence the benefits of energy conversion, particularly in axial-flow turbine blades having low aspect ratios (span-to-chord ratio of the blade).

A device of the above-mentioned description has become known through Japanese publication JP-A2 67 404.

The boundary layer step which projects forward towards the oppositely located wall of the duct, acts with its face against the oblique transverse flow. This obstacle occasions a wedge-shaped backflow of the flow or boundary layer, and upon overflowing of the edge of the boundary layer step or its face, advantageously leads to the formation of a new boundary layer on the appearance of this step. Serving for the conductance away of the fluid which is backed upon at the face is a downstream pressure dropoff gradient and/or a mixing of this fluid with the fluid of the core or base flow. No additional demands are imposed on an eventual cooling of the duct walls, and there is produced an extensively troublefree blade suction side flow near the duct walls.

The intensity of the secondary eddy displaced away from the suction side of the blade into the individual duct is lower because the velocity components resulting from the transverse pressure dropoff will not traverse the full traverse pressure dropoff gradient. The mixing losses at said step or face edge are also reduced, in essence, since the Mach-number at which the mixing takes place is overall lower than directly at the suction side of the blade.

SUMMARY OF THE INVENTION

Accordingly, it is a primary object of the present invention to render the production of the boundary layer step less complex and inexpensive.

It is a more specific object of the present invention to provide an arrangement in which the boundary layer step is formed at the surface contacting two adjacent blade platforms forming the duct wall, through the one blade platform, and where the mentioned face arises from the abutment surface of this blade platform.

The faces produced from these abutment faces of the collective blade platforms of the annular row of blades or blade cascade all point towards the pressure sides of the blades. During the manufacture of the blade cascade, the manufacturing tolerances can be so selected that during the assembly of the cascade, the face will presently be formed at the abutment surfaces of the blade platforms. The simplest is the step when the mentioned abutment surface, and therewith the face, is linear when viewed lengthwise. The step always consists of the mentioned, in general vertical, for example at axial-steps radial, face, and of a rise reaching up to the suction side of the blade. The face can also be concave or otherwise hollowed out inwardly.

Pursuant to the invention, there are set forth advantageous contours, positions and lengths of the mentioned face or boundary layer step to thereby reduce secondary losses. This step causes any losses to be held to a minimum when its face extends along a flow line of the base flow, inasmuch as then, in the event that the face is higher than the thickness of the boundary layer, the base flow will not impinge against the face, thereby preventing any appreciable turbulence. It is advantageous to dimension the boundary layer step in a predetermined manner since the central portion of the oblique transverse flow primarily causes secondary losses. Quite in general, the step inclusive its face, in effect, the rise or projection of the step viewed lengthwise, may be allowed to vary in its height. The constant lengthwise height or the maximum height of the step lies in the magnitude of the thickness of the boundary layer of the oblique tranverse flow without the step; it is preferably about equal to this thickness up to about twice this thickness.

The present invention can be utilized for stator and/or rotor blade cascades or their duct walls. In axial-flow turbomachines the two duct walls consist of a radially inner wall and a radially outer wall; for centrifugal compressors, for example, the two duct walls follow each other in the axial direction of the compressor.

BRIEF DESCRIPTION OF THE DRAWINGS

Reference may now be had to the description of two embodiments of the invention in an individual duct of a bladed flow duct of an axial-flow turbine in schematic and simplified arrangement, in which the duct wall shown herein is the radially inner wall. In the drawings:

FIGS. 1 and 2 illustrate one of the embodiments, wherein FIG. 1 is a plan view in a radial direction I or the turbine (see FIG. 2), and FIG. 2 is a somewhat enlarged sectional view of the turbine taken along line II—II (see FIG. 1);

DETAILED DESCRIPTION

Figure 1:
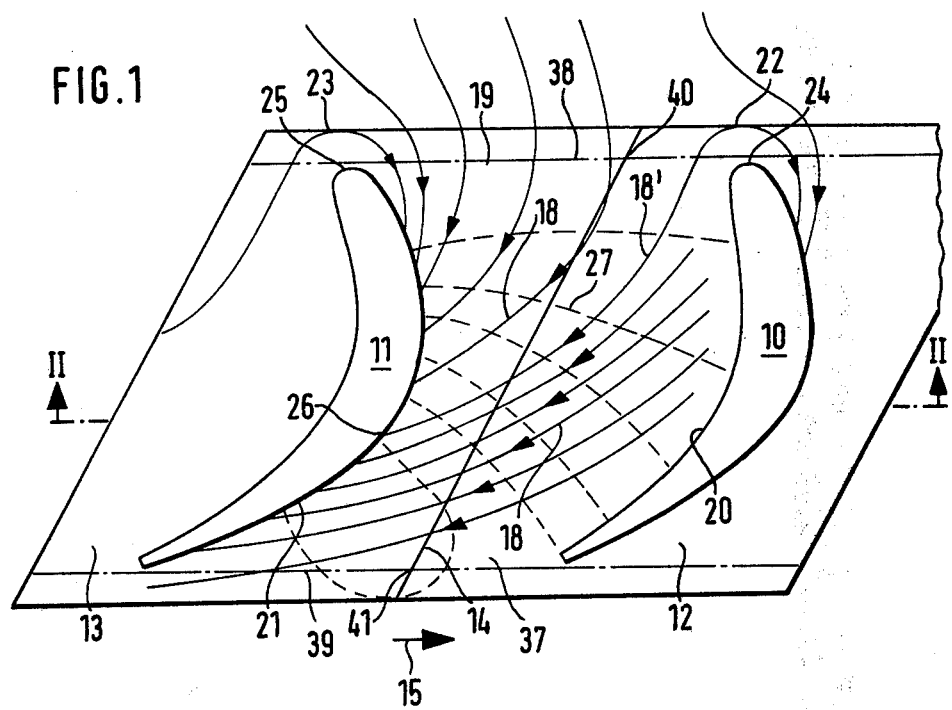
Figure 2:
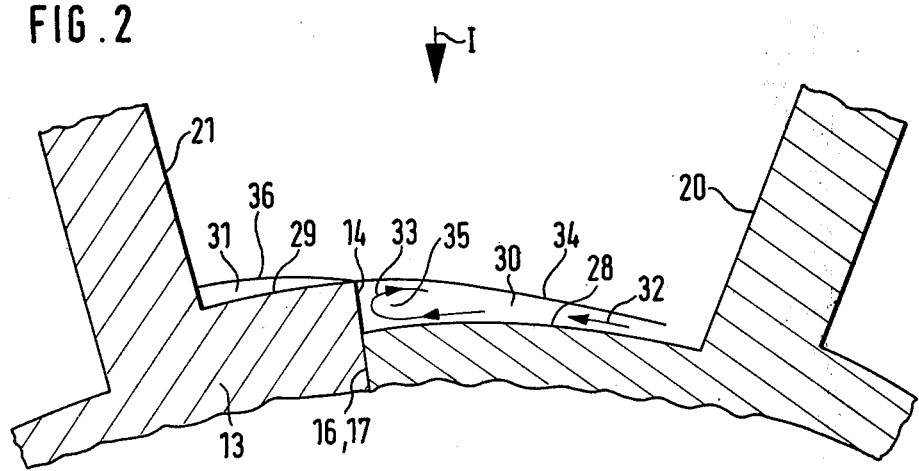

In accordance with FIGS. 1 and 2, a blade 10 and a blade platform 12 form a unit, and a blade 11 and a blade platform 13 form another unit. These platforms 12 and 13, when viewed in a plan as in FIG. 1, assume the shape of a parallelogram. They are identical, form a duct wall of the individual duct which extends in a curve between its inlet 19 and its outlet 37, and they abut against each other with their radially extending, surfaces 16 and 17 linearly extending obliquely to the circumferential direction (arrow 15).

The boundary layer step consists of a face 14 directed towards the concave pressure size 20 of the blade 10 and of a raised surface 29. The convex suction side of the blade 11 is designated with reference numeral 21. In FIG. 1, the flow lines 18 provided with the flow directional arrows represent the oblique transverse flow, particularly when assuming that this step 14, 29 is not present. The entering boundary layer detaches at locations 22 and 23 in the manner of a "bow wave" ahead of the rounded blade leading edges 24 and 25, and the flow line 18' coming from location 22 reaches the suction side 21 at location 26. Of the oblique transverse flow the base portion downstream of this flow line 18' impinging against the suction side 21 is the one which is the most secondary loss causing. Shown also in FIG. 1 in phantom lines are the equipotential lines (lines of equal pressure) 27. These lines signify a downstream pressure dropoff gradient in the individual duct.

The face 14 extends, when viewed longitudinally, along a linear, having reference to FIG. 1. The step 14, 29, as in FIG. 2, is formed by the platform 13, in which the face 14 is a radial extension of the surface 17; the face 14 extends radially. The duct wall consists of a wall portion 28 and the step 14, 19. The face 14 extends essentially closer to the suction side 21; in the sectional view of the turbine taken along line II—II, the face 14 is somewhat less than one-third of the width of duct at that location distanced from the suction side 21.

In FIG. 2 there are illustrated the obliquely transversely flowing boundary layer 30 on the wall portion 28 and the newly formed boundary layer 31 on the raised surface 29 of the step. The flow of the boundary layer 30 is indicated by the arrow 32 and the eddy or vortex arrow 33. At the face 14 the boundary layer 30 is backed up in the form of a wedge, in essence, the thickness of the boundary layer 30 grows to the height of the face 14 by the time it reaches the latter, see the boundary layer-boundary line 34. The boundary layer fluid which is braked by the face 14 is conveyed from the zone 35 ahead of the face 14 to downstream areas within the base flow. The boundary contour of the boundary layer 31 is indicated by the reference numeral 36.

The wall portion 28 and the raised surface 29 are portions of surfaces generated about the longitudinal centerline of the turbine, which is not shown in the drawings (see FIG. 2). Moreover, (see FIG. 1) the platforms 13 and 12 extend beyond the inlet 19 and the outlet 37. This applies equally to the step 14, 29. In a further embodiment (see FIG. 1) the step 14, 29 commences at about the inlet 19 and terminates at about its outlet 37, refer to points 40 and 41. In this arrangement, the platforms reach only, for example, from about the inlet 19 to about the outlet 37, refer to the phantom lines 38 and 39.

Figure 3:
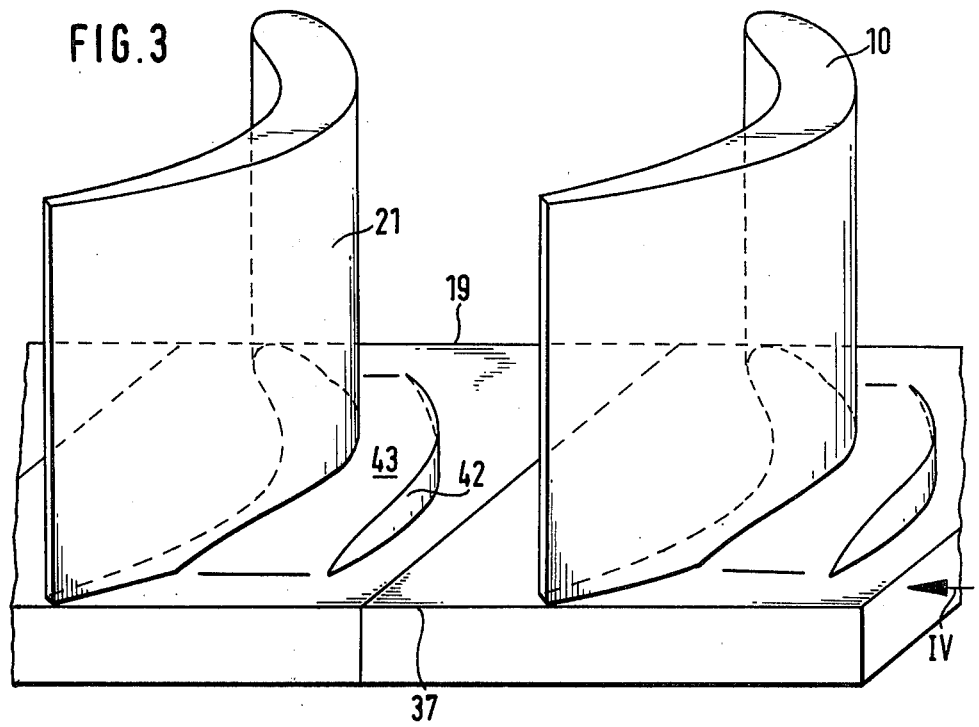
FIGS. 3 and 4 illustrate a preliminary stage to the alternative embodiment.
Figure 4:
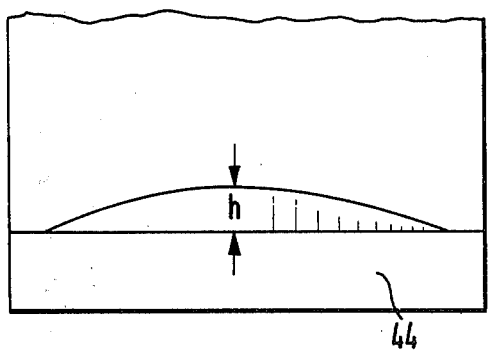

In accordance with FIGS. 3 and 4, the step consisting of a face 42 and a raised surface 43 commences behind the inlet 19 and terminates ahead of outlet 37. The raised surface 43, when viewed longitudinally, is convexly curved, and its height is zero at its beginning and at its end. The greatest height of the raised surface 43 is located in the central area of the raised surface 43, referring to FIG. 4.

The face 42, when viewed longitudinally, extends in parallel with the suction side 21. The blade platform 44 commences at the inlet 19 and terminates at the outlet 37. This platform 44 and the step 42, 43, usually inclusive of the blade 10, are from a unitary casting.

Figure 5:
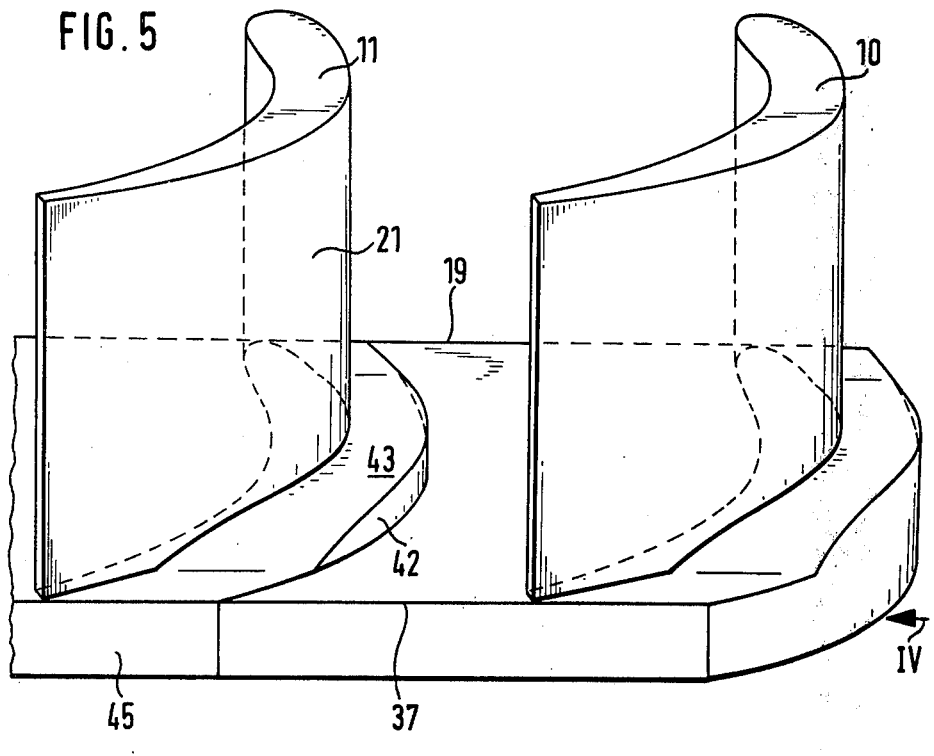
FIGS. 5 and 6 illustrate the second embodiment, in which the duct wall with the blades pursuant to FIG. 3 or 5 is developed in a plane and shown in a perspective view, and pursuant to FIG. 4 or 6 is illustrated as viewed from direction IV (see FIG. 3 or 5).
Figure 6:
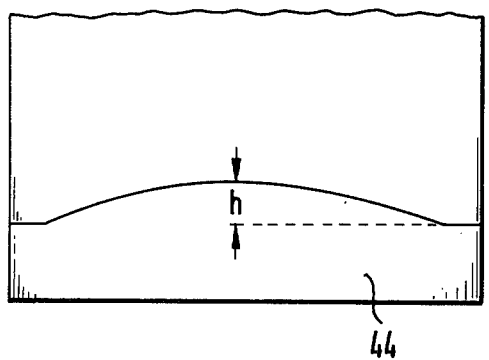

The construction pursuant to FIGS. 5 and 6 are the same, except that the step 42, 42 is formed by the blade platform 43 at the two blade platforms 44 and 45 both of which form the duct wall and abut against each other between the two blades 10 and 11, in essence, in the individual duct wherein the face 42 extends from the abutting surface of the blade platform 45.

What is claimed is:

1. An arrangement for the reduction of secondary flow losses in a bladed flow duct of a turbomachine having a plurality of turbine blades arranged circumferentially therearound along a circumferential direction, with each turbine blade being mounted upon a separate platform, and each turbine blade having opposite convex and concave sides, with the concave side defining a pressure side of the blade and the convex side defining a suction side of the blade, such that the convex suction side of each turbine blade faces a concave pressure side of an adjacent blade, and the concave pressure side of each turbine blade faces a convex suction of an adjacent blade, said bladed flow duct defining a duct wall having a boundary layer step between circumferentially adjacent blades, said boundary layer step being directed towards the concave pressure side of an adjacent turbine blade, said boundary layer step extending obliquely, relative to said circumferential direction, in a direction along a approximately parallel with the suction side of the blade, and the boundary layer step in the longitudinal direction thereof having a convex shape and having a zero height at the beginning and at the end thereof.

2. An arrangement as claimed in claim 1, said boundary layer step in the longitudinal direction thereof extending generally vertically and at an angle to the oblique transverse flow of the boundary layer along the duct wall.

3. An arrangement as claimed in claim 1 or 2, said boundary layer step extending more proximate to the convex suction side of an adjacent turbine blade than to the concave pressure side of an adjacent turbine blade.

4. An arrangement as claimed in claim 1 or 2, wherein said boundary layer step commences in the individual duct at about its inlet and terminates at about its outlet.

5. An arrangement as claimed in claim 1 or 2, wherein said boundary layer step commences in the individual duct downstream of its inlet and terminates at a point upstream of its outlet.

* * * * *